United States Patent Office 3,766,161
Patented Oct. 16, 1973

3,766,161
PREPARATION OF POLYCYCLOPENTADIENE
Aaron Chung Liong Su, Wilmington, Del., assignor to E. I. du Pont de Nemours and Company, Wilmington, Del.
No Drawing. Filed May 8, 1972, Ser. No. 251,136
Int. Cl. C08f 1/34
U.S. Cl. 260—93.1                                      7 Claims

ABSTRACT OF THE DISCLOSURE

A homopolymer of a cyclopentadiene can be prepared by subjecting to polymer-forming conditions a reaction mixture in which the sole catalyst component is a vanadyl fluoride compound of the formula

In this formula, Z can be (1) OR wherein R is alkyl or aryl, (2) a beta-acyl ketonate or a fluorine-substituted derivative thereof, or (3) F, provided the compound is present in the form of a specified ether complex of $VOF_3$ having the formula $VOF_3 \cdot E_n$ wherein $n$ is 1–3.

---

This invention relates to a process for the manufacture of homopolymers from cyclopentadiene hydrocarbons.

There is a need in the polymer-manufacturing art for a new and useful process for preparing polycyclopentadiene.

SUMMARY OF THE INVENTION

The present invention provides a process for preparing a homopolymer of a cyclopentadiene hydrocarbon which comprises (A) preparing a reaction mixture comprised of a cyclopentadiene hydrocarbon and, as the sole catalyst component, a vanadyl fluoride compound of the formula

wherein Z is selected from the group: F, OR wherein R is a $C_1$–$C_{10}$ alkyl group or a $C_6$–$C_{20}$ aryl group, beta-acyl ketonates whose ketonate group has 1–10 carbon atoms, and fluorine-substituted derivatives of said ketonates; with the proviso that when Z is F, the compound is in the form of an ether complex of $VOF_3$ having the formula $VOF_3 \cdot E_n$, $n$ being a number of 1, 2 or 3, and E being an ether selected from the group: tetrahydrofuran, aliphatic ethers having 1–10 carbon atoms, 3,3-dimethyloxetane and glyme, and (B) subjecting said reaction mixture to polymer-forming conditions until said homopolymer is formed.

DESCRIPTION OF PREFERRED EMBODIMENTS

In some of the most useful embodiments of the invention, the cyclopentadiene hydrocarbon used in forming the reaction mixture of step (A) is cyclopentadiene. However, known substitution products of cyclopentadiene can be used, including benzo-cyclopentadiene (also known as indene), cyclopentadiene having a $C_1$–$C_5$ alkyl substituent, and the like. For the sake of convenience, the cyclopentadiene hydrocarbon is sometimes referred to herein simply as cyclopentadiene.

The vanadyl fluoride compound described above is the only catalyst component present in the reaction mixture. A catalyst content of about 0.01–100 millimoles per liter of reaction mixture is preferred in most applications, with special preference for a catalyst content of about 0.1–10 millimoles. Generally a relatively high catalyst content within the specified range is used when (a) the amount of aprotic liquid present (discussed below) is relatively high, (b) the particular catalyst present is relatively low in reactivity, or (c) the temperature during step (B) is relatively low.

Regarding the above-mentioned ether component of the ether complex type of catalyst, it is known in the art that glyme is ethylene glycol dimethyl ether. In the ketonate type of catalyst, as indicated, the ketonate group can be fluorine-substituted (e.g., with at least 1 and preferably not more than 6 fluorine atoms).

It will be noted that the present process employs a difluoro or trifluoro vanadyl fluoride catalyst as the sole catalyst component. This compound is not mixed with an organo-aluminum compound or other metal compound, or any other catalyst component; yet the process proceeds with unexpected success. This is quite surprising in view of such prior art as U.S. Pat. 3,576,763 issued Apr. 27, 1971, to A. Su (the inventor of the present process), and U.S. Pat. 2,962,488 issued Nov. 29, 1960, to S. Horne.

The preparation of some preferred species of the vanadyl fluoride catalyst compound is illustrated below in the examples. One skilled in the art will be able to make suitable modifications in the methods illustrated in order to prepare other members of the class of catalyst compounds described above.

The reaction mixture preferably contains as a diluent an organic aprotic liquid which does not become polymerized during step (B). In many cases it is also preferred that the aprotic liquid be a solvent for the specified catalyst. This results in a reaction mixture in which the catalyst is in solution in a mixture of said aprotic liquid and the cyclopentadiene. The term "aprotic liquid" herein means a liquid having no reactive hydrogen atoms (giving off no protons) under the conditions which exist during steps (A) and (B). A liquid is selected which is inert in the sense that it will undergo no harmful reaction with the other ingredients present in the reaction mixture. The liquid can be selected from such well known aprotic liquids as hexane, cyclohexane and other aliphatic and cycloaliphatic hydrocarbons; benzene, toluene and other benzene hydrocarbons; dichlorobenzene, perchloroethylene and other halogenated hydrocarbons; and the like.

The amount of aprotic liquid present in the reaction mixture is one of the factors which determine the rate of polymer formation during step (B). If the polymer-forming reaction rate is too slow with a given set of ingredients and reaction conditions, the amount of aprotic liquid added is decreased until the desired increase in reaction rate is obtained. And if the reaction rate is too fast, enough additional aprotic liquid is added to provide the desired decrease in reaction rate.

It is also possible to use a reaction mixture wherein the catalyst is in solution in cyclopentadiene alone, no other solvent or diluent for the catalyst being present during steps (A) and (B).

It is usually best to keep the reaction mixture covered with an inert gas during step (B), for example nitrogen, helium or argon. This prevents any harmful amount of air or moisture from coming in contact with the reaction mixture.

The reaction mixture is preferably kept at a temperature of about 20–45° C. during step (B). A temperature is selected for a particular application which is high enough to provide reasonably fast polymer-formation, but not high enough to cause any harmful dimerization of the cyclopentadiene.

In the majority of applications, I prefer to keep the reaction mixture under atmospheric pressure in step (B).

Although higher or lower pressures can be used, they tend to increase the cost of the product and usually provide no significant advantage in process efficiency or product properties.

After completing step (B), any suitable known polymer isolation method can be used to separate the polymer product from the other components of the mixture. For example, the polymer can be separated from the aprotic liquid by precipitation (if dissolved), by filtration (if slurried), or by evaporation or distillation of the liquid from a polymer solution or slurry. The polymer can be purified by washing according to known methods, for example by agitation in a blender with methanol or another suitable alcohol, preferably adding to the alcohol a small amount of hydrochloric acid as illustrated in Example 1 below. The washed polymer can be filtered and dried, preferably under vacuum at about room temperature.

The present process is very useful for the manufacture of homopolymers from cyclopentadiene hydrocarbons. The process enables one to prepare polycyclopentadiene (including high molecular weight grades) with surprising ease and efficiency. The polymer chain contains equal amounts of 1,4 and 1,2 types of polymer structure resulting from 1,4-addition and 1,2-addition of the monomer units. High molecular weight grades of the product can be cured to a very tough rubbery material by using known vulcanization methods such as those known to be useful for curing styrene-butadiene copolymer rubber.

The following examples illustrate the invention; all amounts are by weight unless otherwise indicated.

Example 1

Polycyclopentadiene is prepared by (1) providing a polymerization flask (glass resin kettle) which has been purged with nitrogen and equipped with a stirrer, thermometer and 3-way stopcock; (2) introducing into the flask 100 grams of cyclopentadiene and 300 ml. (milliliters) of benzene (aprotic liquid diluent); (3) adjusting the temperature of the mixture in the flask to 25° C.; (4) while stirring the mixture vigorously, adding 10 ml. of a hexane solution containing 0.15 gram of a catalyst of the $VOF_2Z$ formula described above wherein Z is $OC_2H_5$; this compound, which can be called vanadyl difluoride ethoxide, is now in solution in the step (2) mixture; (5) carrying out the polymer-formation at atmospheric pressure by stirring the reaction mixture for three hours while maintaining its temperature at about 25–30° C. and maintaining the nitrogen atmosphere in the flask; (6) adding 10 ml. of methanol to the reaction mixture to stop the polymerization reaction; (7) pouring the contents of the flask with stirring into 500 ml. of methanol to which 1 ml. of concentrated hydrochloric acid has been added, thereby precipitating the polycyclopentadiene; (8) decanting off the liquid and washing the polymer by adding another 500 ml. of methanol containing 1 ml. of concentrated hydrochloric acid and using a blender to agitate the mixture vigorously for three minutes; (9) using a cheesecloth filter to isolate the precipitated polymer; and (10) drying the polymer under a vacuum at 25° C., the dried polymer weighing 30 grams.

The polymer obtained in Example 1 contains about an equal number of 1,4 and 1,2 units in the polycyclopentadiene polymer chain, as shown by nuclear magnetic resonance analysis. It will be noted that the catalyst used in this process does not direct the polymerization preferentially toward the 1,4 structure; the product obtained is not a predominately 1,4 structure. The polymer has a relatively high molecular weight as indicated by the fact that it is a solid, and when cured with a sulfur-type curing agent it has high tensile strength.

In an optional modification of Example 1, one can add a small amount (e.g., about 0.1–0.2 gram) of a suitable antioxidant to the methanol used in step (6) so as to improve the oxidation resistance of the product. The antioxidant can be selected from types known to be useful for improving the oxidation resistance of styrene-butadiene rubber.

The vanadyl difluoride ethoxide catalyst added in step (4) of Example 1 can be prepared by (a) providing a polyethylene flask which has been purged with nitrogen and which contains 300 ml. of hexane; (b) adding to the flask at 25° C. with stirring 12.4 grams of $VOF_3$ (vanadyl trifluoride) to form a suspension of the $VOF_3$; (c) adding to the flask at 25° C. with stirring 10.1 grams of vanadyl triethoxide, and stirring the mixture until a solution of the catalyst in hexane is obtained.

Example 2

Polycyclopentadiene is prepared by repeating Example 1 except the catalyst used in step (4) is replaced with 10 ml. of a benzene solution containing 0.34 gram of a catalyst of the formula $VOF_3 \cdot E_n$ wherein $n$ is 3 and E is tetrahydrofuran (THF); this ether complex of vanadyl trifluoride can be written as $VOF_3 \cdot 3THF$, or as $$VOF_3 \cdot (THF)_3$$

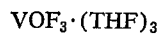

The catalyst used in Example 2 can be prepared by mixing 3.72 grams of $VOF_3$, 7.4 ml. of THF and 30 ml. of benzene at 25° in a flask which has been purged with nitrogen, thereby forming a homogeneous solution.

If it is desired to replace the above THF complex of $VOF_3$ with a catalyst which is the glyme complex of $VOF_3$, the latter can be prepared by mixing 2.0 grams of $VOF_3$, 5.0 ml. of purified glyme and 80 ml. of benzene for ten minutes at 25° C. in a flask which has been purged with nitrogen.

Example 3

Polycyclopentadiene is prepared by repeating Example 1 except (a) in step (2), 300 ml. of cyclopentadiene is used, and the benzene is omitted;
(b) the catalyst solution of step (4) is replaced with 0.2 gram of oxodifluoro(acetylacetonato)vanadium;
(c) in step (5), the reaction mixture is stirred for only 15 minutes instead of 3 hours; and
(d) about 100 grams of dry polymer is obtained in step (10).

The catalyst used in Example 3 can be prepared by (1) providing a polyethylene flask which has been purged with nitrogen and which contains 10 grams of acetyl acetone dissolved in 100 ml. of hexane; (2) adding to the flask with stirring 12.4 grams of $VOF_3$, and stirring the mixture for 60 minutes at 25° C.; (3) passing a stream of nitrogen through the resulting mixture for two hours to remove hydrofluoric acid; (4) using a filtration apparatus equipped with a filter paper to isolate the product, which is a dark solid substance; (5) washing the product three times with hexane at 25° C.; and (6) drying the product under a vacuum at 25° C. The product is stored in a polyethylene flask under a blanket of nitrogen. The product is composed predominantly of $VOF_2AA$, which can be called either vanadyl difluoride acetyl acetonate or oxodifluoro(acetylacetonato)vanadium; it also contains a small amount of $VOF(AA)_2$, which can be considered about the equivalent of an inert ingredient in the process of Example 3 since it is a very much slower acting catalyst than $VOF_2AA$.

If it is desired to replace the above $VOF_2AA$ catalyst with a catalyst which has a fluorine-substituted ketonate group containing 6 fluorine atoms, the latter can be prepared by (a) providing a polyethylene flask which has been purged with nitrogen and which contains 1.24 grams of $VOF_3$; (b) adding to the flask at 25° C. with stirring 150 ml. of hexane and 2 ml. of hexafluoroacetyl acetone; (c) stirring the mixture for fourteen hours; (d) allowing the solids to settle; (e) removing the hexane by decanting; (f) adding 50 ml. of benzene and stirring for thirty minutes; (g) and depositing the resulting red crystalline solid on a filter paper and washing it twice with hexane. Analysis shows the product to be $$VOF_2(C_5F_6HO_2)$$

This catalyst can be called oxodifluoro(hexafluoroacetylacetonato)vanadium. The catalyst can be dissolved in hexane, benzene or other suitable aprotic liquid before it is added to the polymerization flask.

I claim:

1. A process for preparing a homopolymer of a cyclopentadiene hydrocarbon which comprises
   (A) preparing a reaction mixture comprised of a cyclopentadiene hydrocarbon and, as the sole catalyst component, a vanadyl fluoride compound of the formula

wherein Z is selected from the group: F, OR wherein R is a $C_1$–$C_{10}$ alkyl group or a $C_6$–$C_{20}$ aryl group, beta-acyl ketonates whose ketonate group has 1–10 carbon atoms, and fluorine substitution products of said ketonates; with the proviso that when Z is F, the compound is in the form of an ether complex of $VOF_3$ having the formula $VOF_3 \cdot E_n$, $n$ being a number of 1, 2 or 3, and E being an ether selected from the group: tetrahydrofuran, aliphatic ethers having 1–10 carbon atoms, 3,3-dimethyloxethane and glyme, the reaction mixture having a catalyst content of about 0.01–100 millimoles per liter, and said cyclopentadiene hydrocarbon being selected from the group: cyclopentadiene, benzo-cyclopentadiene and cyclopentadienes having a $C_1$–$C_5$ alkyl substituent, and (B) subjecting said reaction mixture to polymer-forming conditions at about 20–45° C. until said homopolymer is formed.

2. A process according to claim 1 wherein the cyclopentadiene hydrocarbon used in step (A) is cyclopentadiene, and the polymer formed in step (B) is polycyclopentadiene.

3. A process according to claim 2 wherein said catalyst is present in the reaction mixture of step (A) as a solution in cyclopentadiene.

4. A process according to claim 2 wherein the reaction mixture of step (A) also comprises a diluent composed of an organic aprotic liquid which does not become polymerized during step (B).

5. A process according to claim 2 wherein the reaction mixture is kept covered with an inert gas during step (B).

6. A process according to claim 1 wherein said catalyst is oxodifluoro(acetylacetonato)vanadium.

7. A process according to claim 1 wherein the cyclopentadiene hydrocarbon used in step (A) is benzo-cyclopentadiene.

References Cited
UNITED STATES PATENTS 2,962,488  11/1960  Horne _____ 260—94.7
3,576,763  4/1971   Su _____ 252—431

JOSEPH L. SCHOFER, Primary Examiner
S. M. LEVIN, Assistant Examiner

U.S. Cl. X.R.
252—441